United States Patent [19]

Walsh

[11] Patent Number: 4,570,492

[45] Date of Patent: Feb. 18, 1986

[54] ELECTROCHEMICAL FLOWMETER

[76] Inventor: Myles A. Walsh, 60 Barnabas Rd., Falmouth, Mass. 02540

[21] Appl. No.: 655,744

[22] Filed: Oct. 1, 1984

[51] Int. Cl.$^4$ .............................................. G01P 5/18
[52] U.S. Cl. .................. 73/861.05; 204/411; 73/181
[58] Field of Search ........................... 73/862.05, 181; 204/411, 400, 406

[56] References Cited

U.S. PATENT DOCUMENTS

| | | | |
|---|---|---|---|
| 1,611,502 | 12/1926 | Allen | 73/861.05 |
| 2,640,936 | 6/1953 | Pajes | 73/861.05 |
| 3,019,647 | 2/1962 | Beard et al. | 73/861.05 X |
| 4,152,935 | 5/1979 | Nagaishi et al. | 73/861.05 |

FOREIGN PATENT DOCUMENTS

| | | | |
|---|---|---|---|
| 2944979 | 5/1981 | Fed. Rep. of Germany | 73/861.05 |
| 0512388 | 1/1955 | Italy | 73/861.05 |

Primary Examiner—Charles A. Ruehl

[57] ABSTRACT

A device for measuring the velocity of flow of a liquid comprises electrodes over which the liquid flows. A chemical emitting electrode is mounted so as to contact the liquid at a first point and is supplied with periodic input pulses by a current pulse generator such that chemicals are caused to be periodically generated on its surfaces. A second chemical detecting electrode is mounted downstream of the first point. The second electrode is connected to a potentiostatic circuit which produces an output signal when it detects the arrival of chemicals produced by the first electrode. A circuit measures the time between an input pulse and the corresponding output signal such that the velocity of the flow of the liquid can be determined.

4 Claims, 1 Drawing Figure

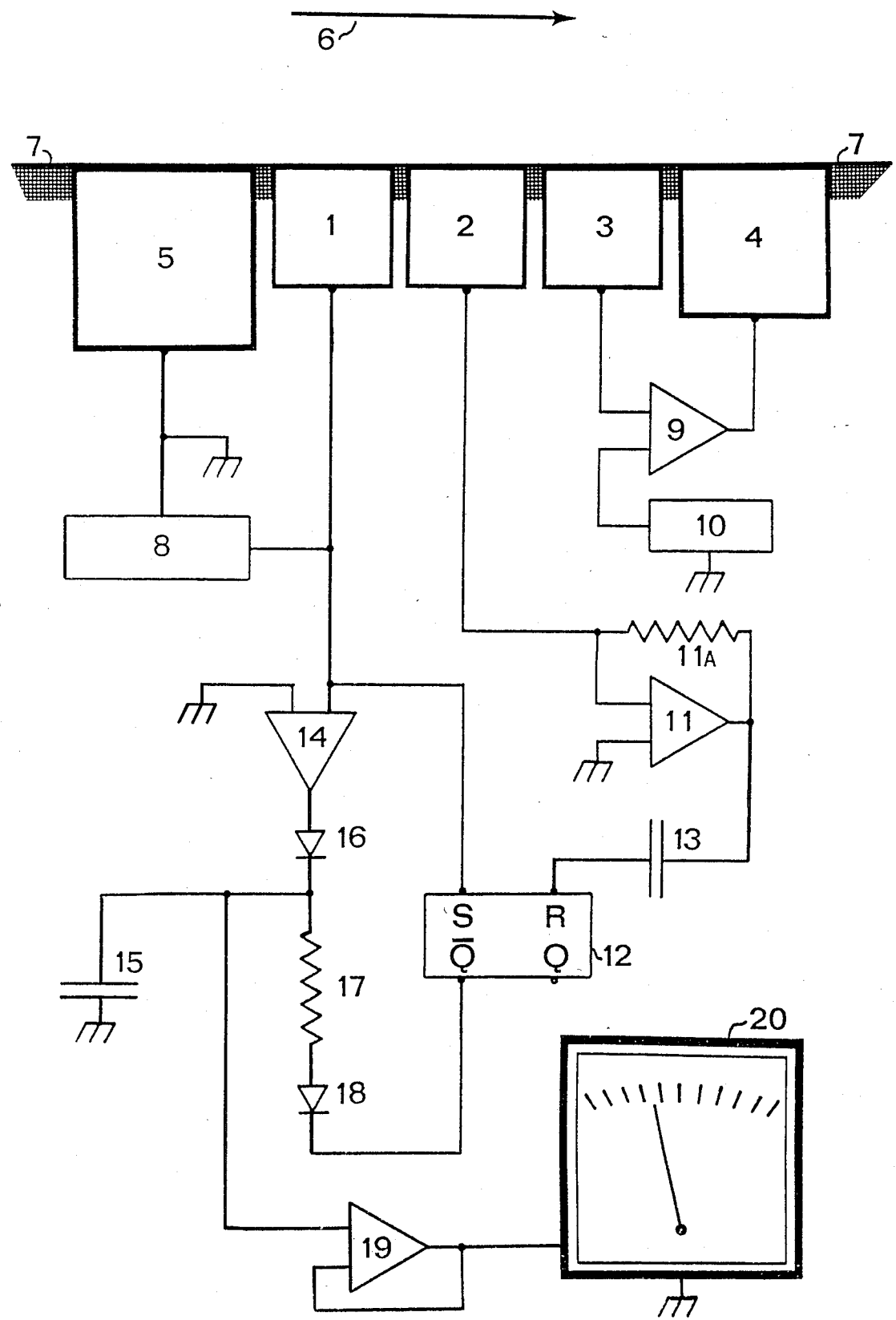

4,570,492

ELECTROCHEMICAL FLOWMETER

BACKGROUND OF THE INVENTION

The present invention relates to a process for measuring the velocity of flow of a fluid by determining the transit time of an electrochemically generated marker over a reference distance, and to a flowmeter using the process.

In the past, a large number of different types of flowmeters have been proposed which measure the time of transit of a tracer or tag over a predetermined distance. One form of tracer is a visible dye or float that can be manually observed and timed. This form of tracer is obviously not suitable for making continuous velocity measurements and cannot be used at great depths. Another form of tracer employs radioactive material. Although a tracer of this type can be sensed by an instrument, it possesses certain hazards. When employing either form of tracer, it is very difficult, if not impossible, to store an adequate supply of dye or radioactive material at the location of the instrument to permit unattended operation for an extended period of time. It is also necessary to physically eject the tracer into the fluid. It is very difficult and expensive to design and build an ejection mechanism that will operate effectively particularly for extended periods of time when subjected to severe marine fouling.

More recently it has been proposed to produce a thermal tracer by heating a volume of fluid above the ambient temperature of the surrounding fluid. This technique is described in a number of publications, including U.S. Pat. Nos. 3,399,566 and 4,335,616. A temperature sensor such as a thermometer or thermistor senses the passage of the heated fluid whereby the transit time of the heated fluid over a predetermined distance can be measured. Unfortunately, this technique is limited to gases and is totally unsuitable for liquids. Gases typically have low thermal inertia and are poor conductors of heat. Thus they are relatively easy to tag and the tag persists in gases over a time longer than the transit time. Liquids have relatively large thermal inertia and good thermal conductivity. Thus in liquids, temperature tags become poorly defined prior to the time it takes the tag to reach the sensor and the accuracy, effectiveness, response time, etc. of such a device has been very poor.

The present invention relates to a process for measuring the flow velocity of a liquid which employs electrochemically generated marking elements and which gives a precision comparable to that of the usual measurements which make use of the mechanics of fluids, whilst remaining simple and inexpensive.

The invention also relates to such a process of measurement, where the marking element is produced from the fluid itself.

SUMMARY OF THE INVENTION

According to the present invention there is provided a process for measuring the velocity of flow of a liquid comprising the steps of electrochemically causing periodically a brief change in the chemical composition of the liquid at the first flow point, and detecting this disturbance electrochemically at a second point, the first and second point being spaced by a small predetermined distance in the direction of flow of the fluid, and determining the time between the moments at which the disturbance is caused and the disturbance is detected.

Devices which attempt to measure the time of transit of a detectable chemical disturbance are very well known in the prior art, and can take many forms. All prior forms, however, suffer from their inability to accurately sense the arrival of the chemical disturbance. When convective diffusion takes place in liquids, the main variations of concentration occur within the first few percent of the hydrodynamic boundary layer. For most geomtries this distance is measured in fractions of inches. Convective stirring by the flow results in very rapid dilution of the chemical disturbance. Thus attempts to produce a detectable chemical disturbance in a fluid either through electrochemical or chemical means have suffered from difficulties in accurately determining the arrival time of the chemical disturbance.

In a typical embodiment of the present invention, a chemical generating electrode is positioned at a fixed point in the stream. Immediately downstream from this point is located a sensing electrode sensitive to the chemicals generated at the generating electrode. Alternatively so as not to project into the fluid, the generating and sensing electrodes are placed on an electrically insulating wall arranged to contact said liquid with the generating electrode upstream of the sensing electrode. The more precise embodiment of the invention involves chemical generating electrode means and chemical detecting electrode means which are very closely spaced. The preferred spacing is typically a distance equal to less than five percent of the width of the local hydrodynamic boundary layer.

Although numerous electrical arrangements are available for sensing changes in the concentrations of electrolytes, the most reliable response is obtained when the sensing electrode is connected by means of a simple potentiostat circuit. The preferred electrolytic sensing cell consists of an electrode to inject current (the counter electrode), the sensing electrode (the working electrode), and a small probe to measure the voltage in the solution near the working electrode (the reference electrode). This circuit holds the potential of the sensing electrode fixed at a potential such that any material arriving from the generating electrode will be immediately electrochemically consumed. The arrival of material is thus sensed as a rapid increase in the electrical current needed to keep the sensing electrode at constant potential with respect to the reference. The counter electrode for the sensing circuit can but need not be the same as the counter electrode for the generating circuit. The theory of operation of reference electrodes and the commercial forms of said electrodes will be found in the book entitled "Tables of Standard Electrode Potentials" by Guilio Milazzo published in 1978 by John Wiley & Sons, Ltd.

In an embodiment, a disturbance in the chemical state of the fluid is caused at a first point of the flow and the time which separates the instants at which the disturbance is detected at two points downstream of the first point and separated from one another by a reference distance in the direction of flow is measured. The two instants at the respective ends of the measuring interval are detected by phenomena of the same nature, and the creation of the periodic disturbance can be automatic.

The invention also extends to a flowmeter for a fluid, comprising a length of pipeline through which the fluid flows, electrochemical emitting means for producing chemicals in response to an electrical input pulse, a disturbance to the chemical state of the fluid positioned in the pipeline at a first point in its length, an electrochemical detector means sensitive to the disturbance in the chemical state of the fluid for emitting an output signal, the detector being positioned in the pipeline at a second point in its length spaced downstream of said first point in the direction of flow by a small and predetermined distance, a pulse generator for periodically applying an input pulse to said emitting means, and means connected to said pulse generator and to said detector for measuring the time between an input pulse and the corresponding output signal.

It is clear that in a pipeline through which the fluid flows there is a direct relation between the velocity and the delivery rate. The repetition of the determinations in step with a pulse generator provides a substantially constant measurement of the delivery rate.

Preferably, the emitting means and the detecting means are thin film electrodes mounted flush with the wall and in very close proximity one to another. The theory and practice of placing thin conductive metal films on insulating surfaces will be found in "Thin Films- Interdifusion and Reactions" edited by J. M. Poate et al and published in 1978 by John Wiley & Sons. Techniques for developing complicated and closely spaced geometries through the use of photolithography are well known. This arrangement exhibits very little drag and the pulsing circuit can operate several times a second. This arrangement is especially suitable when flowmeters of this type are used as speed indicators in nautical vessels, and especially small sailing vessels. The thin film electrodes are preferably made from electrically conductive and chemically stable materials which specifically catalyze the appropriate electrochemical reactions. By way of example and not by way of limitation, gold film electrodes plated with platinum are preferred for evolving and consuming hydrogen in fresh water. Platinum film electrodes coated with titanium ruthenium spinels are preferred for evolving and consuming chlorine in sea water. These thin film electrodes are connected by means of small insulated wires which penetrate through the hull of the vessel to means for detecting the time of transmit of electrochemically produced disturbances.

Preferably, the electrochemical reactions chosen for producing and detecting the chemical(s) should produce chemical(s) which are not abundantly found in the liquid. By way of example but not by way of limitation, dissolved chlorine and trichloride ions are the preferred chemicals for measuring the flow rate of salt water and dissolved hydrogen is the preferred chemical for measuring the flow rate of fresh water.

The present invention provides a flow meter for measuring ocean currents and flows over the hulls of boats. In one operative version of the present invention this is accomplished by providing a flow meter having a swinging vane that may be immersed in the ocean so as to line up with the flow of water. In another, the generating electrode means is surrounded by a plurality of sensing electrode means. The response of the particular sensing electrode means located immediately downstream of the generating electrode means is relatively larger than the responses of the other electrodes. By measuring the times of transmit between the generating electrode means and the plurality of sensing electrode means, both the magnitude and the direction of a flow across a surface can be simultaneously detected.

The accurate sensing of the relative speed of the flow of sea water across the deck of a submarine is necessary during underwater missile launches. This invention provides shipboard sensors that are accurate, reliable, compact and maintenance free. They are especially useful for measuring the low cross flow speeds encountered during missile launches.

BRIEF DESCRIPTION OF THE DRAWING

Other features and many of the attendant advantages of this invention will readily be understood from the following detailed description of a preferred embodiment when considered in connection with the appended drawing which shows diagrammatically a flowmeter according to the invention.

DESCRIPTION OF THE PREFERRED EMBODIMENT

The flowmeter shown in the drawing has chemical emitting electrode means 1, chemical detecting electrode means 2, a reference electrode 3, as well as counter electrode means 4 and counter electrode means 5. These five elements are all arranged to contact the flowing liquid, which also serves as the electrolyte for electrochemical reactions. The five elements are typically mounted flush on an electrically insulating wall 7 over which flows a stream of said liquid in the direction of the arrow 6.

The hydrodynamic flow 6 comes to rest at wall 7. The distance over which this change in speed takes place is known as the hydrodynamic boundary thickness and is readily calculated or measured by persons skilled in the art. To facilitate the sensing of the arrival of the chemical change, the chemical detecting electrode means 2 should be located no further apart than ten percent of this hydrodynamic boundary layer thickness downstream from the chemical emitting electrode means 1. With this arrangement the speed of the flow is inversely proportional to the transit time of the chemical from the chemical emitting electrode means 1 to the chemical detecting electrode means 2.

A periodic current source 8 delivers to the chemical emitting electrode means 1 a current for a period of time sufficient to electrochemically generate chemical(s) adsorbed on the surface of the chemical emitting electrode means. An ionic current flows through the liquid as a result of and during these pulses to counter electrode means 5. The time between successive pulses is large compared to the time of travel of the fluid from the chemical emitting means 1 to the chemical detecting means 2 at the minimum measurable flow rate of the fluid.

The preferred technique for detecting the arrival of chemical(s) at the chemical detecting means 2 involves clamping the voltage of this detecting means fixed with respect to a reference electrode 3 and measuring the current required to do this with a potentiostatic circuit. The electrolytic cell consists of a second counter electrode 4 to inject current, a common return electrode (the chemical detecting electrode means 2), and the reference electrode 3 to measure the voltage in the solution near the chemical detecting electrode means 2. An amplifier 9 maintains a voltage equal to the reference voltage 10 between the reference electrode 3 and the chemical detecting electrode means 2 by varying the current into the second counter electrode 4 appropriately. A second amplifier 11 holds the chemical electrode detecting means 2 at virtual ground, converting said current to an output voltage. Feed back resistor 11a is located between the output and input of amplifier 11 to regulate its gain.

A flip-flop 12 is enabled by the pulses coming from the periodic current source 8 and is disabled by the pulses coming across a differentiating capacitor 13 from the output of the current-to-voltage converter 11. The output of the current generator 8 is also connected to the input of an amplifier 14 which is not provided with feed back such that it is either conducting or not. A capacitor 15 is connected so that it is charged, via a diode 16, by the saturation output potential of the amplifier 14, and is gradually discharged via a resistance 17 and a diode 18 by the negative output of the flip-flop 12, which is at zero potential with respect to earth when the flip-flop is enabled. A buffer amplifier 14, having virtually infinite input impedance, transmits the charge potential of the capacitor 15 to the potentiometric device 20.

The process of operation may be described as follows: each pulse delivered by the periodic current source 8 causes an abrupt rise in the production of chemicals at the chemical emitting electrode means 1 over the duration of the pulse. After the end of the pulse, the chemicals dissolve into the flowing fluid and through a combination of diffusion and convection find their way downstream to the chemical detecting electrode means 2. When this chemical disturbance reaches the chemical detecting electrode means 2, after a time inversely proportional to the main stream flow, an electrode current is generated by the potentiostatic current. This current is detected as a sharp rise in voltage at the output of amplifier 11. It will be noted that the diffusion of chemicals only has the effect of reducing the concentration gradient of the convected fluid and only slightly reduces the steepness of the measured sharp rise in voltage at the output of amplifier 11.

The output of amplifier 11 is further steepened by capacitor 13 so that a relatively large voltage spike is sent to flip-flop 12.

The pulse which has come from the periodic current source 8 has simultaneously enabled flip-flop 12 and charged the capacitor 15 via the diode 16 by means of the amplifier 14. At the end of this pulse, the capacitor 15 discharges to the negative output of the flip-flop 12, via the resistance 17 and the diode 18, whilst the diode 16 prevents discharge to the output of the amplifier 14. When the capacitor 13 emits the pulse corresponding to the detection the flip-flop is disabled and its negative output changes to a high potential, so that the capacitor 15 ceases to discharge. Since the amplifier 19 has infinite input impedance, it transmits the potential at the terminals of the capacitor 15 to the potentiometric device 20 without affecting the charging or discharging of the capacitor 15.

Of course the potentiometric device 20 reacts both to the applied mean potential and to the potential at the end of the discharge, via a suitable circuit known to those skilled in the art, such as an integrator or a sampler actuated by the disabling of the flip-flop.

It will be understood that if it is desired to trigger an alarm when the speed of the flow exceeds a predetermined value, the control of the alarm device is connected in parallel to the potentiometric device. The same type control device, operating on the basis of insufficient potential, can be used to signal a flow rate lower than a predetermined threshold level.

While only a limited number of embodiments of the present invention are disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. A flowmeter for measuring the relative velocity of liquid flow therepast, said meter including:
   a chemical emitting electrode means, arranged to contact said liquid and to generate one or more chemicals by electrochemical reactions with said liquid,
   a chemical detecting electrode means, arranged to contact said liquid downstream of said chemical emitting electrode means and to consume by electrochemical reactions said chemical(s) earlier generated by said chemical emitting electrode means,
   a reference electrode, arranged to contact said liquid,
   a counter electrode means, arranged to contact said liquid,
   a second counter electrode means, arranged to contact said liquid,
   a current source for periodically applying a current to said chemical emitting means,
   a potentiostatic circuit for maintaining the voltage of said chemical detecting means essentially constant with respect to said reference electrode, and containing a current-to-voltage converter for producing a voltage rise on the arrival of chemical(s) earlier produced by said chemical emitting means,
   and means connected to said periodic current source and said potentiostatic circuit for measuring the time between an input current pulse and the corresponding output voltage rise.

2. A flowmeter according to claim 1, wherein said means for measuring the time comprises a flip-flop with an enabling input connected to said periodic current source and a disabling input connected by way of a first capacitor to the output of said current-to-voltage converter, a second capacitor which is charged in response to the pulses from said periodic current source and is then discharged across a resistance by the enabled flip-flop, and the voltage stored on said second capacitor measured by a potentiometric means, having a substantially infinite input resistance connected to the terminals of said second capacitor.

3. A flowmeter according to claim 1, wherein said liquid is seawater, said chemicals are dissolved chlorine and trichloride ions, and said reference electrode is silver covered with silver chloride.

4. A flowmeter according to claim 1, wherein said liquid is fresh or brackish water and said chemical is dissolved hydrogen.

* * * * *